US011969924B2

United States Patent
Sugai et al.

(10) Patent No.: US 11,969,924 B2
(45) Date of Patent: Apr. 30, 2024

(54) WATERPROOF COMPONENT AND ELECTRONIC EQUIPMENT PROVIDED WITH SAME, METHOD FOR WATERPROOFING INSERT MOLDED BODY, AND METHOD FOR WATERPROOFING ELECTRONIC EQUIPMENT

(71) Applicant: KURARAY CO., LTD., Kurashiki (JP)

(72) Inventors: Naoto Sugai, Tsukuba (JP); Yuki Ito, Tsukuba (JP); Takaharu Shigematsu, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 349 days.

(21) Appl. No.: 16/650,033

(22) PCT Filed: Oct. 26, 2018

(86) PCT No.: PCT/JP2018/039883
§ 371 (c)(1),
(2) Date: Mar. 24, 2020

(87) PCT Pub. No.: WO2019/087961
PCT Pub. Date: May 9, 2019

(65) Prior Publication Data
US 2020/0290249 A1  Sep. 17, 2020

(30) Foreign Application Priority Data

Oct. 30, 2017  (JP) ................. 2017-208765

(51) Int. Cl.
*B29C 70/12*  (2006.01)
*B29C 45/14*  (2006.01)
*H04M 1/02*  (2006.01)

(52) U.S. Cl.
CPC ........ *B29C 45/14786* (2013.01); *B29C 70/12* (2013.01); *H04M 1/0274* (2013.01)

(58) Field of Classification Search
CPC . B29C 45/14786; B29C 70/12; H01M 1/0274
See application file for complete search history.

(56) References Cited

U.S. PATENT DOCUMENTS 2,380,515 A  *  7/1945  Gits ................. B29C 45/14786
138/140
5,248,467 A  *  9/1993  Cushman ................ B29C 45/73
264/102

(Continued)

FOREIGN PATENT DOCUMENTS

| CN | 102089134 A | 6/2011 |
| CN | 103562316 A | 2/2014 |

(Continued)

OTHER PUBLICATIONS

Office Action dated Apr. 5, 2022, in corresponding Japanese Patent Application No. 2019-550320, 2 pages.

(Continued)

*Primary Examiner* — Andrew D Graham
(74) *Attorney, Agent, or Firm* — Oblon, McClelland, Maier & Neustadt, L.L.P.

(57) ABSTRACT

The present invention relates to a waterproof component that is an insert molded body formed from a thermoplastic resin composition and a metal component, wherein
the thermoplastic resin composition contains a thermoplastic resin (A) and an inorganic fibrous reinforcement (B);
the content of the inorganic fibrous reinforcement (B) is 8 to 130 parts by mass based on 100 parts by mass of the thermoplastic resin (A); and
the inorganic fibrous reinforcement (B) has an average fiber diameter of 10 µm or less and an average fiber length of 300 µm or less.

16 Claims, 2 Drawing Sheets

Thickness: 1.3 mm

(56) References Cited

U.S. PATENT DOCUMENTS

| | | | |
|---|---|---|---|
| 2007/0152380 A1* | 7/2007 | Muller | B29C 45/14008 |
| | | | 425/134 |
| 2007/0299169 A1 | 12/2007 | Ohira et al. | |
| 2008/0292851 A1* | 11/2008 | Egerer | B29C 45/14688 |
| | | | 428/196 |
| 2009/0029122 A1* | 1/2009 | Krause | B29C 45/1418 |
| | | | 264/173.11 |
| 2009/0208721 A1* | 8/2009 | Tsuchiya | B29C 70/086 |
| | | | 264/250 |
| 2009/0275678 A1* | 11/2009 | Kumazawa | C08L 69/00 |
| | | | 525/225 |
| 2011/0039470 A1* | 2/2011 | Wakeman | B32B 27/18 |
| | | | 428/300.7 |
| 2011/0196080 A1* | 8/2011 | Matsuoka | C08L 77/00 |
| | | | 525/92 B |
| 2012/0028062 A1* | 2/2012 | Elia | B32B 27/12 |
| | | | 428/474.7 |
| 2012/0097412 A1* | 4/2012 | Wennemer | B29C 43/02 |
| | | | 156/245 |
| 2013/0286655 A1* | 10/2013 | Tamura | C08K 3/22 |
| | | | 524/436 |
| 2014/0135441 A1 | 5/2014 | Sasaki et al. | |
| 2014/0146448 A1* | 5/2014 | Yoo | B29C 45/14336 |
| | | | 361/679.01 |
| 2014/0190445 A1* | 7/2014 | Reese | F02F 7/0073 |
| | | | 29/527.1 |
| 2015/0273774 A1* | 10/2015 | Stips | B29C 70/865 |
| | | | 428/99 |
| 2015/0314499 A1* | 11/2015 | Asanuma | B29C 45/0046 |
| | | | 425/500 |
| 2015/0326147 A1 | 11/2015 | Shimizu et al. | |
| 2015/0376353 A1* | 12/2015 | Takebe | C08J 5/04 |
| | | | 428/161 |
| 2016/0096317 A1* | 4/2016 | Wang | B32B 3/263 |
| | | | 264/250 |
| 2016/0200883 A1* | 7/2016 | Habraken | C08J 5/12 |
| | | | 428/474.4 |
| 2016/0207238 A1* | 7/2016 | Habraken | C08J 5/10 |
| 2016/0273160 A1* | 9/2016 | Braymand | B29C 51/266 |
| 2017/0028684 A1 | 2/2017 | Imai et al. | |
| 2018/0312692 A1 | 11/2018 | Okunaga et al. | |
| 2019/0031838 A1 | 1/2019 | Suzuki et al. | |
| 2020/0086588 A1* | 3/2020 | Shinohara | B32B 5/02 |

FOREIGN PATENT DOCUMENTS

| | | |
|---|---|---|
| EP | 1 770 126 A1 | 4/2007 |
| EP | 2 928 064 A1 | 10/2015 |
| JP | 2002-33155 A | 1/2002 |
| JP | 2006-310009 A | 11/2006 |
| JP | 2007-182071 A | 7/2007 |
| JP | 2010-286544 A | 12/2010 |
| JP | 2012-59381 A | 3/2012 |
| JP | 2014-141630 A | 8/2014 |
| JP | 2014-229469 A | 12/2014 |
| JP | 2015-209521 A | 11/2015 |
| JP | 2016-56260 A | 4/2016 |
| JP | 2016-81737 A | 5/2016 |
| JP | 2016-190411 A | 11/2016 |
| JP | 2017-137404 A | 8/2017 |
| KR | 10-2010-0094523 A | 8/2010 |
| WO | WO 2009/151145 A1 | 12/2009 |
| WO | WO 2016/038945 A1 | 3/2016 |
| WO | WO 2017/072986 A1 | 5/2017 |
| WO | WO 2017/110646 A1 | 6/2017 |
| WO | WO 2017/131018 A | 8/2017 |

OTHER PUBLICATIONS

Japanese Office Action dated Jun. 22, 2021 in Japanese Patent Application No. 2019-5501320, 6 pages.
Combined Chinese Office Action and Search Report dated Jul. 20, 2021 in Chinese Patent Application No. 201880070007.7, 16 pages.
Extended European Search Report dated Feb. 3, 2021 in European Patent Application No. 18872505.5, 6 pages.
International Search Report dated Jan. 22, 2019 in PCT/JP2018/039883 filed Oct. 26, 2018, 2 pages.

* cited by examiner

Thickness: 1.3 mm

Surface of LED lead frame before dripping red ink

Back surface of LED lead frame before dripping red ink

Surface of LED lead frame after dripping red ink (right)

Back surface of LED lead frame after permeation with red ink (left)

WATERPROOF COMPONENT AND ELECTRONIC EQUIPMENT PROVIDED WITH SAME, METHOD FOR WATERPROOFING INSERT MOLDED BODY, AND METHOD FOR WATERPROOFING ELECTRONIC EQUIPMENT

TECHNICAL FIELD

The present invention relates to a waterproof component and an electronic device provided with the same, a method for waterproofing an insert molded body, and a method for waterproofing an electronic device, and so on.

BACKGROUND ART

In recent years, electronic devices, such as smartphones, have been frequently required to have waterproofness. An external connection terminal of such an electronic device is typically a composite of a resin or a resin composition and a metal component. In many cases, the metal component is exposed to the outside, and the waterproofness on a joint surface between the resin or resin composition and the metal is of a problem. As a waterproofing method in such an external connection terminal, a method of using a sealing material, such as an elastic body, has hitherto been known (see PTL 1, etc.). However, there were involved problems in, for example, a point that the component cannot be completed through a single process because of installation of the elastic body; a point that it is difficult to achieve downsizing; and a point that costs are generated for the elastic body itself or a process of installing it.

Then, there is proposed a production method of a waterproof component through insert molding by subjecting a metal component having been inserted into a die to injection molding with a resin or a resin composition, thereby undergoing integral joining (see PTLs 2 and 3, etc.).

CITATION LIST

Patent Literature

PTL 1: JP 2002-33155 A
PTL 2: JP 2012-59381 A
PTL 3: JP 2016-81737 A
PTL 4: JP 2014-141630 A

SUMMARY OF INVENTION

Technical Problem

However, in general, the metal component and the resin or resin composition are largely different from each other with respect to expansion and shrinkage characteristics. Therefore, in particular, in an insert molded body using a glass fiber-containing resin composition, in an insert molding process, a reflow process, and a sequent cooling process, a stress is generated according to a difference in the expansion and shrinkage characteristics, and a minute gap is liable to be generated between the metal component and the resin or resin composition, so that a problem remains with respect to the waterproofness.

That is, a problem of the present invention is to provide a waterproof component that is an insert molded body, which has sufficient waterproofness even after a heating process, such as a reflow process, and an electronic device provided with the same.

Solution to Problem

As a result of extensive and intensive investigations, the present inventors have found that in a waterproof component that is an insert molded body formed from a thermoplastic resin composition and a metal component, the waterproofness is improved by adding a specified amount of a specified inorganic fibrous reinforcement to a thermoplastic resin to be used, and further made investigations on the basis of such finding, thereby leading to accomplishment of the present invention.

The present invention relates to the following [1] to [17].
[1] A waterproof component that is an insert molded body formed from a thermoplastic resin composition and a metal component, wherein
the thermoplastic resin composition contains a thermoplastic resin (A) and an inorganic fibrous reinforcement (B);
the content of the inorganic fibrous reinforcement (B) is 8 to 130 parts by mass based on 100 parts by mass of the thermoplastic resin (A); and
the inorganic fibrous reinforcement (B) has an average fiber diameter of 10 μm or less and an average fiber length of 300 μm or less.
[2] The waterproof component as set forth in [1], wherein a melting point or glass transition temperature of the thermoplastic resin (A) is 130° C. or higher.
[3] The waterproof component as set forth in [1] or [2], wherein a melting point of the thermoplastic resin (A) is 280° C. or higher.
[4] The waterproof component as set forth in any of [1] to [3], wherein the thermoplastic resin (A) is at least one selected from the group consisting of a liquid crystal polymer, a polycarbonate, a polyphenylene sulfide, and a polyamide.
[5] The waterproof component as set forth in [4], wherein the thermoplastic resin (A) is a polyamide in which 50 to 100 mol % of a diamine unit thereof is an aliphatic diamine unit having 4 to 18 carbon atoms.
[6] The waterproof component as set forth in any of [1] to [5], wherein the inorganic fibrous reinforcement (B) is at least one selected from the group consisting of wollastonite, a potassium titanate whisker, and a milled fiber.
[7] The waterproof component as set forth in [6], wherein the inorganic fibrous reinforcement (B) is wollastonite.
[8] The waterproof component as set forth in any of [1] to [7], which is used for an application to be applied in a surface mounting process.
[9] The waterproof component as set forth in any of [1] to [8], which is an external connection terminal.
[10] The waterproof component as set forth in any of to [8], which is a switch.
[11] An electronic device provided with the waterproof component as set forth in any of [1] to [10].
[12] The electronic device as set forth in [11], which is a portable electronic device.
[13] A method for waterproofing an insert molded body formed from a thermoplastic resin composition and a metal component, the method including using a thermoplastic resin composition, wherein
the thermoplastic resin composition contains a thermoplastic resin (A) and an inorganic fibrous reinforcement (B);
the content of the inorganic fibrous reinforcement (B) is 8 to 130 parts by mass based on 100 parts by mass of the thermoplastic resin (A); and
the inorganic fibrous reinforcement (B) has an average fiber diameter of 10 μm or less and an average fiber length of 300 μm or less.

[14] Use for waterproofing an insert molded body formed from a thermoplastic resin composition and a metal component, wherein
the thermoplastic resin composition contains a thermoplastic resin (A) and an inorganic fibrous reinforcement (B);
the content of the inorganic fibrous reinforcement (B) is 8 to 130 parts by mass based on 100 parts by mass of the thermoplastic resin (A); and
the inorganic fibrous reinforcement (B) has an average fiber diameter of 10 μm or less and an average fiber length of 300 μm or less.

[15] A method for waterproofing an electronic device, including using the waterproof component as set forth in any of [1] to [8] as an external connection terminal.

[16] A method for waterproofing an electronic device, including using the waterproof component as set forth in any of [1] to [8] as a switch.

[17] A method for producing a waterproof component, including subjecting a thermoplastic resin composition and a metal component to insert molding, the thermoplastic resin composition being obtained through melt kneading of 100 parts by mass of a thermoplastic resin (A) and an inorganic fibrous reinforcement (B) having an average fiber diameter of 10 μm or less and an average fiber length of 300 μm or less in a use amount of 8 to 130 parts by mass.

Advantageous Effects of Invention

In accordance with the present invention, it is possible to provide a waterproof component that is an insert molded body, which has sufficient waterproofness even after a heating process, such as a reflow process, and an electronic device provided with the same.

DESCRIPTION OF EMBODIMENTS

Figure 1:
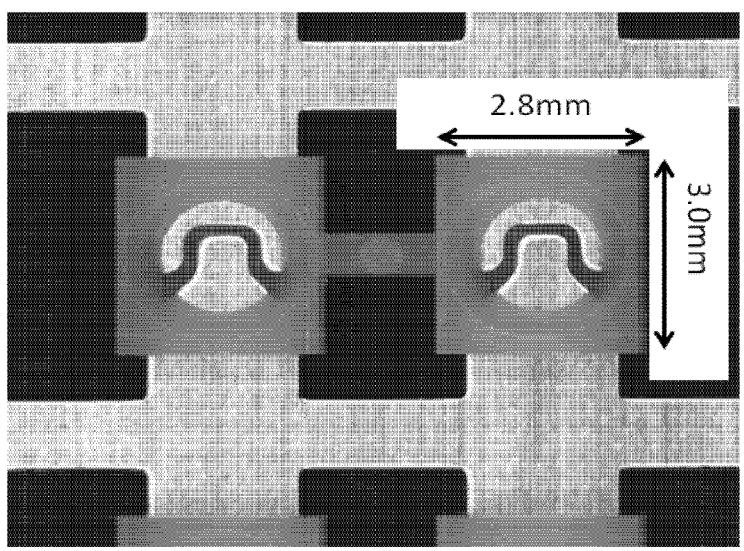
FIG. 1 is concerned with a photograph of a molded article used in a red ink test in the working examples. The external dimensions of the molded article are 2.8 mm in width, 3.0 mm in depth, and 1.3 mm in thickness.

The present invention is hereunder described in detail.
The waterproof component of the present invention is an insert molded body formed from a thermoplastic resin composition and a metal component, wherein the thermoplastic resin composition contains a thermoplastic resin (A) and an inorganic fibrous reinforcement (B); the content of the inorganic fibrous reinforcement (B) is 8 to 130 parts by mass based on 100 parts by mass of the thermoplastic resin (A); and the inorganic fibrous reinforcement (B) has an average fiber diameter of 10 μm or less and an average fiber length of 300 μm or less.

By using the aforementioned thermoplastic resin composition, the waterproofness of an insert molded body formed from the thermoplastic resin composition and the metal component (on a joint surface between the thermoplastic resin composition and the metal) is improved, and the waterproofness of the waterproof component becomes sufficient.

Although the reason for this is not always elucidated yet, it may be considered that by using the aforementioned thermoplastic resin composition, a stress of the resin composition, which remains after the insert molding process or heating process, is relaxed, whereby the generation of a gap on a joint surface between the thermoplastic resin composition and the metal can be prevented.

(Thermoplastic Resin (A))

The thermoplastic resin (A) which is used in the present invention is not particularly limited so long as it is able to give the aforementioned effects. Examples thereof include a polycarbonate; a polyphenylene oxide; a polyphenylene sulfide (PPS); a polysulfone; a polyether sulfone; a polyarylate; a cyclic polyolefin; a polyether imide; a polyamide; a polyamide-imide; a polyimide; a liquid crystal polymer, such as an aromatic polyester and an aromatic polyester amide; a polyaminobismaleimide; and a polyetheretherketone.

Above all, from the viewpoint of dimensional stability and heat resistance, at least one selected from the group consisting of a liquid crystal polymer, a polycarbonate, PPS, and a polyamide is preferred, PPS and a polyamide are more preferred, and a polyamide is still more preferred.

From the viewpoint of waterproofness, heat resistance, and moldability, in the thermoplastic resin (A), it is preferred that its melting point or glass transition temperature is 130° C. or higher.

In the present invention, the wording "melting point or glass transition temperature is 130° C. or higher" means that at least either one of the melting point and the glass transition temperature is 130° C. or higher. The melting point or glass transition temperature of the thermoplastic resin (A) is more preferably 150° C. or higher, and still more preferably 170° C. or higher from the viewpoint of heat resistance and moldability, and it is preferably 350° C. or lower, and more preferably 320° C. or lower from the viewpoint of prevention of thermal decomposition of the resin during molding. The melting point and the glass transition temperature in the present invention are those as measured by the methods described in the section of Examples.

The melting point of the thermoplastic resin (A) is preferably 280° C. or higher, more preferably 285° C. or higher, and still more preferably 295° C. or higher. So long as the melting point of the thermoplastic resin (A) is the aforementioned temperature or higher, even when the waterproof component containing the thermoplastic resin (A) is used for an application to be exposed to a heating process, such as a reflow process, the sufficient waterproofness can be maintained.

(Polyamide)

The polyamide is preferably one having a dicarboxylic acid unit and a diamine unit.

Examples of the dicarboxylic acid unit include structural units derived from aliphatic dicarboxylic acids, such as oxalic acid, malonic acid, succinic acid, glutaric acid, adipic acid, pimelic acid, suberic acid, azelaic acid, sebacic acid, undecanedicarboxylic acid, dodecanedicarboxylic acid, dimethylmalonic acid, 2,2-diethylsuccinic acid, 2,2-dimethylglutaric acid, 2-methyladipic acid, and trimethyladipic acid; alicyclic dicarboxylic acids, such as 1,3-cyclopentanedicarboxylic acid, 1,3-cyclohexanedicarboxylic acid, 1,4-cyclohexanedicarboxylic acid, cycloheptanedicarboxylic acid, cyclooctanedicarboxylic acid, and cyclodecanedicarboxylic acid; aromatic dicarboxylic acids, such as terephthalic acid, isophthalic acid, 1,4-naphthalenedicarboxylic acid, 2,6-naphthalenedicarboxylic acid, 2,7-naphthalenedicarboxylic acid, diphenic acid, 4,4'-biphenyldicarboxylic acid, diphenylmethane-4,4'-dicarboxylic acid, and diphenylsulfone-4,4'-dicarboxylic acid; and so on. These units may be either one kind or two or more kinds.

So long as the effects of the present invention are not impaired, the polyamide can also contain a structural unit derived from a trivalent or higher-valent carboxylic acid, such as trimellitic acid, trimesic acid, and pyromellitic acid, within a range where it is possible to perform melt molding.

The polyamide is preferably one in which 50 to 100 mol % of the diamine unit is an aliphatic diamine unit having 4 to 18 carbon atoms, more preferably one in which 60 to 100 mol % of the diamine unit is an aliphatic diamine unit having 4 to 18 carbon atoms, and still more preferably one in which 90 to 100 mol % of the diamine unit is an aliphatic diamine unit having 4 to 18 carbon atoms.

Examples of the aliphatic diamine unit having 4 to 18 carbon atoms include structural units derived from linear aliphatic diamines, such as 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,4-tetradecanediamine, 1,15-pentadecanediamine, 1,16-hexadecanediamine, 1,17-heptadecanediamine, and 1,18-octadecanediamine; branched aliphatic diamines, such as 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine; and so on. These units may be either one kind or two or more kinds.

Above all, the aliphatic diamine unit is preferably a structural unit derived from at least one selected from the group consisting of 1,4-butanediamine, 1,6-hexanediamine, 2-methyl-1,5-pentanediamine, 1,8-octanediamine, 2-methyl-1,8-octanediamine, 1,9-nonanediamine, 1,10-decanediamine, 1,11-undecanediamine, and 1,12-dodecanediamine; and more preferably a structural unit derived from at least one selected from the group consisting of 1,4-butanediamine, 1,6-hexanediamine, 1,9-nonanediamine, 2-methyl-1,8-octanediamine, and 1,10-decanediamine.

In the case where the diamine unit contains both a structural unit derived from 1,9-nonanediamine and a structural unit derived from 2-methyl-1,8-octanediamine, a molar ratio of the structural unit derived from 1,9-nonanediamine and the structural unit derived from 2-methyl-1,8-octanediamine is preferably in a range of 95/5 to 40/60, and more preferably in a range of 90/10 to 50/50 in terms of a [(structural unit derived from 1,9-nonanediamine)/(structural unit derived from 2-methyl-1,8-octanediamine)] ratio.

Depending upon the application, there may be a case where it is preferred that the [(structural unit derived from 1,9-nonanediamine)/(structural unit derived from 2-methyl-1,8-octanediamine)] ratio is in a range of 55/45 to 45/55.

The diamine unit in the polyamide can contain a diamine unit other than the aliphatic diamine unit having 4 to 18 carbon atoms within a range where the effects of the present invention are not impaired. Examples of such a diamine unit include structural units derived from aliphatic diamines, such as ethylenediamine, 1,2-propanediamine, and 1,3-propanediamine; alicyclic diamines, such as cyclohexanediamine, methylcyclohexanediamine, isophoronediamine, norbornene dimethylamine, and tricyclodecane dimethylamine; aromatic diamines, such as p-phenylenediamine, m-phenylenediamine, p-xylylenediamine, m-xylylenediamine, 4,4'-diaminodiphenylmethane, 4,4'-diaminodiphenylsulfone, and 4,4'-diaminodiphenyl ether; and so on. These units may be either one kind or two or more kinds.

The polyamide may contain an aminocarboxylic acid unit. Examples of the aminocarboxylic acid unit include units derived from lactams, such as caprolactam and lauryl lactam; aminocarboxylic acids, such as 11-aminoundecanoic acid and 12-aminododecanoic acid; and so on. The content of the aminocarboxylic acid unit in the polyamide is preferably 40 mol % or less, and more preferably 20 mol % or less based on 100 mol % of a sum total of the dicarboxylic acid unit and the diamine unit of the polyamide.

The polyamide may contain an end capping agent-derived unit. The content of the end capping agent-derived unit is preferably 1.0 to 10 mol %, more preferably 2.0 to 7.5 mol %, and still more preferably 2.5 to 6.5 mol % relative to the diamine unit.

In order to allow the end capping agent-derived unit to fall within the aforementioned desired range, such can be performed by charging the end capping agent in the diamine during charging of polymerization raw materials such that the content of the end capping agent-derived unit falls within the aforementioned desired range. Taking into consideration the fact that the monomer components volatilize during the polymerization, it is desired to make fine adjustments to the charge amount of the end capping agent during charging of polymerization raw materials such that the desired amount of the end capping agent-derived unit is introduced into the resulting resin.

Examples of a method of determining the content of the end capping agent-derived unit in the polyamide include a method in which a solution viscosity is measured, the whole end group amount is calculated according to a relational expression thereof to a number average molecular weight, and the amino group amount and the carboxy group amount as determined through titration are subtracted therefrom, as described in JP 07-228690 A; and a method in which using $^1$H-NMR, the end capping agent-derived unit in the polyamide is determined on the basis of integrated values of signals corresponding to the diamine unit and the end capping agent-derived unit, respectively.

As the end capping agent, a monofunctional compound having reactivity with the terminal amino group or the terminal carboxy group can be used. Specifically, examples thereof include a monocarboxylic acid, an acid anhydride, a monoisocyanate, a monoacid halide, a monoester, a monoalcohol, and a monoamine. From the viewpoint of reactivity and stability of the endcap, etc., a monocarboxylic acid is preferred as the end capping agent relative to the terminal amino group, and a monoamine is preferred as the end capping agent relative to the terminal carboxy group. In addition, from the viewpoint of easiness of handling, etc., a monocarboxylic acid is more preferred as the end capping agent.

The monocarboxylic acid which is used as the end capping agent is not particularly limited so long as it has reactivity with the amino group. Examples thereof include aliphatic monocarboxylic acids, such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids, such as cyclopentane carboxylic acid and cyclohexane carboxylic acid; aromatic monocarboxylic acids, such as benzoic acid, toluic acid, α-naphthalenecarboxylic acid, β-naphthalenecarboxylic acid, methylnaphthalenecarboxylic acid, and phenylacetic acid; and arbitrary mixtures thereof. Of these, from the standpoint of reactivity, stability of endcap, and price, etc., at least one selected from the group consisting of acetic acid, propionic acid, butyric acid, valeric acid, caproic acid, caprylic acid, lauric acid, tridecanoic acid, myristic acid, palmitic acid, stearic acid, and benzoic acid is preferred.

The monoamine which is used as the end capping agent is not particularly limited so long as it has reactivity with the carboxy group. Examples thereof include aliphatic monoamines, such as methylamine, ethylamine, propylamine, butylamine, hexylamine, octylamine, decylamine, stearylamine, dimethylamine, diethylamine, dipropylamine, and dibutylamine; alicyclic monoamines, such as cyclohexylamine and dicyclohexylamine; aromatic monoamines, such as aniline, toluidine, diphenylamine, and naphthylamine; and arbitrary mixtures thereof. Of these, from the standpoint of reactivity, high boiling point, stability of endcap, and price, etc., at least one selected from the group consisting of butylamine, hexylamine, octylamine, decylamine, stearylamine, cyclohexylamine, and aniline is preferred.

The polyamide can be produced by adopting an arbitrary method known as the method for producing a polyamide. For example, the polyamide can be produced by a method, such as a solution polymerization method or an interfacial polymerization method using an acid chloride and a diamine as raw materials; and a melt polymerization method, a solid phase polymerization method, and a melt extrusion polymerization method each using a dicarboxylic acid and a diamine as raw materials.

The polyamide can be, for example, produced by first collectively adding a diamine and a dicarboxylic acid, and optionally a catalyst or an end capping agent, to produce a nylon salt, and then thermally polymerizing the nylon salt at a temperature of 200 to 250° C. to prepare a prepolymer, followed by performing solid phase polymerization, or performing polymerization by using a melt extruder. In the case where the final stage of the polymerization is performed through solid phase polymerization, it is preferred to perform the polymerization under reduced pressure or under an inert gas flow. So long as the polymerization temperature falls within a range of 200 to 280° C., a polymerization rate is large, productivity is excellent, and coloration or gelation can be effectively suppressed. The polymerization temperature in the case of performing the final stage of the polymerization by using a melt extruder is preferably 370° C. or lower, and when the polymerization is performed under such a condition, a polyamide which is substantially free from decomposition and less in deterioration is obtained.

Examples of the catalyst which can be used during producing the polyamide include phosphoric acid, phosphorous acid, hypophosphorous acid, and a salt or an ester thereof. Examples of the salt or ester include a salt of phosphoric acid, phosphorous acid, or hypophosphorous acid with a metal, such as potassium, sodium, magnesium, vanadium, calcium, zinc, cobalt, manganese, tin, tungsten, germanium, titanium, and antimony; an ammonium salt of phosphoric acid, phosphorous acid, or hypophosphorous acid; an ethyl ester, an isopropyl ester, a butyl ester, a hexyl ester, an isodecyl ester, an octadecyl ester, a decyl ester, a stearyl ester, a phenyl ester, etc. of phosphoric acid, phosphorous acid, or hypophosphorous acid.

The polyamide may be any of a crystalline polyamide, an amorphous polyamide, and a mixture thereof.

Examples of the crystalline polyamide include polycaproamide (polyamide 6), polyhexamethylene adipamide (polyamide 66), polytetramethylene adipamide (polyamide 46), polyhexamethylene sebacamide (polyamide 610), polyhexamethylene dodecanamide (polyamide 612), polyundecamethylene adipamide (polyamide 116), poly-bis(4-aminocyclohexyl)methane dodecanamide (polyamide PACM 12), poly-bis (3-methyl-4-aminocyclohexyl)methane dodecanamide (polyamide dimethyl PACM 12), polyundecamethylene terephthalamide (polyamide 11T), polyundecamethylene hexahydroterephthalamide (polyamide 11T(H)), polyundecanamide (polyamide 11), polydodecanamide (polyamide 12), polytrimethyl hexamethylene terephthalamide (polyamide TMDT), polymetaxylylene adipamide (polyamide MXD 6), polyhexamethylene terephthalamide (polyamide 6T), polynonamethylene terephthalamide (polyamide 9T), polydecamethylene terephthalamide (polyamide 10T), polyhexamethylene isophthalamide (polyamide 6I), a copolymer of polyamide 6I and polyamide 6T (polyamide 6I/6T), and a copolymer of polyamide 6T and polyundecanamide (polyamide 11) (polyamide 6T/11), and copolymerization products or mixtures thereof. Ones in which a benzene ring of terephthalic acid and/or isophthalic acid is substituted with an alkyl group or a halogen atom are also included in the crystalline polyamide.

Of the aforementioned crystalline polyamides, polyamide 6, polyamide 66, polyamide 11, polyamide 12, polyamide 46, polyamide 6T, polyamide 9T, and polyamide 10T are preferred; polyamide 6, polyamide 66, polyamide 46, polyamide 6T, polyamide 9T, and polyamide 10T are more preferred; and polyamide 46, polyamide 6T, polyamide 9T, and polyamide 10T are still more preferred. The aforementioned crystalline polyamides may be used alone, or plural kinds thereof may be used in combination.

Examples of the amorphous polyamide include a polycondensate of terephthalic acid/isophthalic acid/1,6-hexanediamine, a polycondensate of terephthalic acid/isophthalic acid/1,6-hexanediamine/bis(3-methyl-4-aminocyclohexyl) methane, a polycondensate of terephthalic acid/2,2,4-trimethyl-1,6-hexanediamine/2,4,4-trimethyl-1,6-hexanediamine, a polycondensate of isophthalic acid/bis (3-methyl-4-aminocyclohexyl)methane/ω-laurolactam, a polycondensate of isophthalic acid/2,2,4-trimethyl-1,6-hexanediamine/2,4,4-trimethyl-1,6-hexanediamine, and a polycondensate of terephthalic acid/isophthalic acid/2,2,4-trimethyl-1,6-hexanediamine/2,4,4-trimethyl-1,6-hexanediamine. Ones in which a benzene ring of terephthalic acid and/or isophthalic acid is substituted with an alkyl group or a halogen atom are also included in the amorphous polyamide.

Of the aforementioned amorphous polyamides, a polycondensate of terephthalic acid/isophthalic acid/1,6-hexanediamine, a polycondensate of terephthalic acid/isophthalic acid/1,6-hexanediamine/bis(3-methyl-4-aminocyclohexyl) methane, and a polycondensate of terephthalic acid/2,2,4-trimethyl-1,6-hexanediamine/2,4,4-trimethyl-1,6-hexanediamine are preferred; and a polycondensate of terephthalic acid/isophthalic acid/1,6-hexanediamine and a polycondensate of terephthalic acid/isophthalic acid/1,6-hexanediamine/bis(3-methyl-4-aminocyclohexyl)methane are more preferred. The aforementioned amorphous polyamides may be used alone, or plural kinds thereof may be used in combination.

(Inorganic Fibrous Reinforcement (B))

Examples of the inorganic fibrous reinforcement (B) which is used in the present invention include wollastonite, a potassium titanate whisker, a calcium carbonate whisker, an aluminum borate whisker, a magnesium sulfate whisker, sepiolite, xonotlite, a zinc oxide whisker, a milled fiber, and a cut fiber. These may be used alone or may be used in combination of two or more thereof.

Of the aforementioned inorganic fibrous reinforcements (B), at least one selected from the group consisting of wollastonite, a potassium titanate whisker, and a milled fiber is preferred; wollastonite or a milled fiber is more preferred, and wollastonite is still more preferred.

The inorganic fibrous reinforcement (B) which is used in the present invention has an average fiber diameter of 10 μm or less and an average fiber length of 300 μm or less. The aforementioned average fiber diameter and average fiber length are those before melt kneading.

Above all, from the viewpoint of waterproofness, the average fiber diameter is preferably 9 μm or less, more preferably 5um or less, and still more preferably 7 μm or less. In addition, from the viewpoint of strength, the average fiber diameter is preferably 2 μm or more, and more preferably 4 μm or more.

Similarly, from the viewpoint of waterproofness, the average fiber length is preferably 250 μm or less, more preferably 200 μm or less, and still more preferably 150 μm or less. In addition, from the viewpoint of strength, the average fiber length is preferably 20 μm or more, more preferably 30 μm or more, and still more preferably 40 μm or more.

In this specification, the "average fiber diameter" means a fiber diameter at a cumulative mass of 50%. The average fiber diameter can be determined by dispersing the inorganic fibrous reinforcement (B) in a 0.2% sodium metaphosphate aqueous solution and measuring the dispersion with a particle diameter distribution measuring apparatus ("SediGraph III 5120", manufactured by Micromeritics Instrument Corporation, etc.) by the X-ray gravitational sedimentation method.

In this specification, the "average fiber length" can be determined from a weight average value obtained by measuring the fiber length of 400 inorganic fibrous reinforcements (B) as arbitrarily selected through image analysis adopting the electron microscope method.

The content of the inorganic fibrous reinforcement (B) is 8 to 130 parts by mass, preferably 40 to 130 parts by mass, and more preferably 45 to 110 parts by mass based on 100 parts by mass of the thermoplastic resin (A). When the content of the inorganic fibrous reinforcement (B) is 8 parts by mass or more, a sufficient reinforcing effect of the inorganic fibrous reinforcement (B) is obtained, and furthermore, a waterproofing effect is also obtained. In addition, when the content of the inorganic fibrous reinforcement (B) is 130 parts by mass or less, melt kneading properties become favorable.

(Other Components)

The thermoplastic resin composition which is used in the present invention may further contain other components than the thermoplastic resin (A) and the inorganic fibrous reinforcement (B), such as a heat stabilizer, a photostabilizer, an elastomer, a lubricant, a nucleating agent, a crystallization retarder, a hydrolysis inhibitor, an antistatic agent, a radical inhibitor, a matting agent, a UV absorber, a flame retarder, and an inorganic material other than the inorganic fibrous reinforcement (B). Examples of the aforementioned inorganic material include carbon nanotube, fullerene, talc, wollastonite, zeolite, sericite, mica, kaolin, clay, pyrophyllite, silica, bentonite, alumina silicate, silicon oxide, magnesium oxide, alumina, zirconium oxide, titanium oxide, iron oxide, calcium carbonate, magnesium carbonate, dolomite, calcium sulfate, barium sulfate, calcium hydroxide, magnesium hydroxide, aluminum hydroxide, glass fiber, glass beads, glass flake, glass powder, ceramic beads, boron nitride, silicon carbide, carbon black, and graphite. The content of the other component in the thermoplastic resin composition can be, for example, set to 50% by mass or less, and it is preferably 20% by mass or less, more preferably 10% by mass or less, and still more preferably 5% by mass or less.

The total content of the thermoplastic resin (A) and the inorganic fibrous reinforcement (B) in the thermoplastic resin composition is, for example, preferably 50% by mass or more, more preferably 80% by mass or more, still more preferably 90% by mass or more, and yet still more preferably 95% by mass or more.

(Metal Component)

The metal constituting the metal component which is used in the present invention is not particularly limited so long as it is able to undergo insert molding. Examples thereof include aluminum, copper, iron, tin, nickel, zinc, and an alloy, such as an aluminum alloy and stainless steel. The surface of such a metal may be plated with aluminum, tin, nickel, gold, silver, or the like.

(Waterproof Component)

It is possible to produce the waterproof component of the present invention by a method of subjecting a thermoplastic resin composition and a metal component to insert molding, the thermoplastic resin composition being obtained through melt kneading of 100 parts by mass of a thermoplastic resin (A) and an inorganic fibrous reinforcement (B) having an average fiber diameter of 10 μm or less and an average fiber length of 300 μm or less in a use amount of 8 to 130 parts by mass, or other method.

On performing the insert molding, an arbitrary method known as the insert molding method, for example, an injection insert molding method and a compression insert molding method, can be adopted.

After the insert molding, processing by an ultrasonic welding method, a laser welding method, a vibration welding method, a thermal welding method, a hot melt method, or the like may be further performed, as the need arises.

In component mounting for mounting an electronic component on a printed circuit board, an insert mounting process of performing welding through dipping in a molten solder tank (dipping tank) has hitherto been applied. Meanwhile, according to surface mounting, the usage of which is recently expanding, a solder paste is printed on a printed wiring board, and an electronic component is then mounted thereon, followed by heating in a reflow furnace generally at about 260° C. to melt the solder, thereby joining the printed wiring substrate and the electronic component to each other. According to the surface mounting, downsizing or improvement in productivity of the printed circuit board can be achieved; however, in the mounted component, in the reflow process and the sequent cooling process, a stress is generated according to a difference in the expansion and shrinkage characteristics between the metal component and the resin or resin composition, and a minute gap is liable to be generated between the metal component and the resin or resin composition, so that it is difficult to maintain the waterproofness.

According to the waterproof component of the present invention, in view of the fact that even after the heating process, such as the reflow process, deformation is hardly caused, and therefore, it is preferred to use the waterproof component of the present invention for an application to be applied in a surface mounting process in which such a reflow process id adopted. The heating process, such as the reflow process, may be applied several times, as the need arises.

Since the waterproof component of the present invention is excellent in waterproofness, it is useful as an external connection terminal, such as FPC connector, BtoB connector, card connector, SMT connector (e.g., coaxial connector), and memory card connector; an SMT relay; an SMT bobbin; a socket, such as memory socket and CPU socket; a switch, such as command switch and SMT switch; a sensor, such as rotation sensor and acceleration sensor; and so on. Above all, the waterproof component of the present invention is useful as a switch or an external connection terminal of an electronic device, and especially useful as a switch.

In the case of using the waterproof component of the present invention as a switch, when the external dimensions of an insert molded body formed from the thermoplastic resin composition and the metal component are defined as (width)×(depth)×(thickness), the width is preferably 15 mm or less, more preferably 10 mm or less, and still more preferably 5 mm or less; the depth is preferably 50 mm or less, more preferably 25 mm or less, and still more preferably 5 mm or less; and the thickness is preferably 50 mm or less, more preferably 15 mm or less, and still more preferably 3 mm or less. The depth of the external dimensions is regulated to be longer than the width.

When the waterproof component of the present invention is used especially as a switch or an external connection terminal, the electronic device can be effectively made waterproof.

Examples of the electronic device provided with the waterproof component of the present invention include portable electronic devices, such as a digital camera and a smartphone, but it should be construed that the present invention is not limited thereto.

EXAMPLES

The present invention is hereunder described in more detail by reference to Examples, but it should be construed that the present invention is by no means limited by these Examples.

A melting point and a glass transition temperature of the thermoplastic resin (A) used in each of the Examples and Comparative Examples were measured according to the following methods.

(Melting Point and Glass Transition Temperature of Thermoplastic Resin (A))

The melting point of each of polyamides (PA9T and PA46 as mentioned later) used as the thermoplastic resin (A) was determined when a peak temperature of a melting peak appearing at the time of raising the temperature from 30° C. to 360° C. at a rate of 10° C./min in a nitrogen atmosphere by using a differential scanning calorimeter (DSC822), manufactured by Mettler-Toledo K.K. was defined as a melting point (° C.). In the case where plural melting peaks appeared, a peak temperature of melting peak on the highest temperature side was defined as the melting point.

Thereafter, the sample was held at a temperature of 30° C. higher than the melting point for 10 minutes and completely molten, and then cooled to 40° C. at a rate of 10° C./min, followed by holding at 40° C. for 10 minutes. Again, when the temperature was raised to a temperature of 30° C. higher than the melting point at a rate of 10° C./min, an intermediate point at which the DSC curve changed stepwise was defined as the glass transition temperature.

Examples 1 to 6 and Comparative Examples 1 to 3

Into a twin-screw extruder, manufactured by PLABOR Research Laboratory of Plastics Technology Co., Ltd. (screw diameter: 32 mmφ, L/D=30, rotation rate: 150 rpm, discharge rate: 10 kg/h), the thermoplastic resin (A) shown in Table 1 was fed together with an antioxidant, a release agent, and a nucleating agent from a hopper of an uppermost stream part, and the inorganic fibrous reinforcement (B) shown in Table 1 was further fed from a side feeder, followed by melt kneading. The melt-kneaded thermoplastic resin composition was extruded in a strand form, cooled, and then cut, to obtain pellets of the thermoplastic resin composition. All of the amounts of the thermoplastic resin (A) and the inorganic fibrous reinforcement (B) in Table 1 mean "parts by mass".

Using those pellets, the evaluation as a molded article was performed by the following method.

[Red Ink Test (Waterproofing Test)]

Using an injection molding machine TR40EH (manufactured by Sodick Co., Ltd.), the thermoplastic resin composition obtained in each of the Examples and Comparative Examples was subjected to injection molding in a box shape (external dimensions: 2.8 mm in width, 3.0 mm in depth, and 1.3 mm in thickness) on an LED lead frame which had been subjected to nickel plating on a copper matrix, at a maximum temperature of 340° C. and a die temperature of 140° C. and at an injection speed of 100 to 200 mm/s. Using a sample prepared by thermally treating twice the above-obtained tabular molded article with a reflow apparatus having a maximum attained temperature of 260° C. under the following reflow condition, the following red ink test was carried out.

Reflow Condition:

The sample was subjected to temperature rise from 25° C. to 150° C. over 60 seconds, subsequently subjected to temperature rise to 180° C. over 90 seconds, and further subjected to temperature rise to 260° C. over 60 seconds. Thereafter, the sample was held at 260° C. for 20 seconds and then cooled from 260° C. to 100° C. over 30 seconds, and after reaching 100° C., the resulting sample was enclosed with air and then naturally cooled to 23° C.

Red Ink Test:

A red ink (Stamp Ink Red, manufactured by LION OFFICE PRODUCTS CORP.) was dripped in the interior of the mold formed of the thermoplastic resin composition, and after elapsing 5 minutes, it was confirmed whether or not the ink was leaked into the back of the mold. The case where the ink was not leaked at all was judged to be "not leaked", and the case where the ink was leaked was judged to be "leaked". The results are shown in Table 1.

Figure 2:
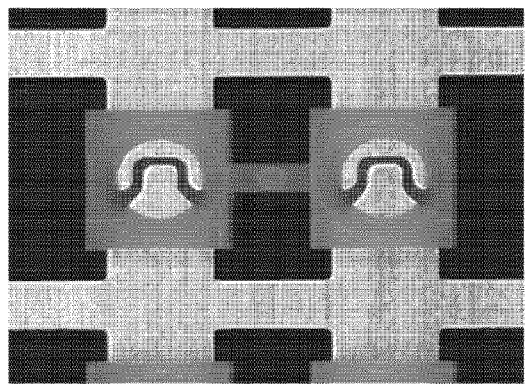
FIG. 2 is concerned with photographs showing the case of being judged to be "leaked" in a red ink test in the working examples.
Figure 2:
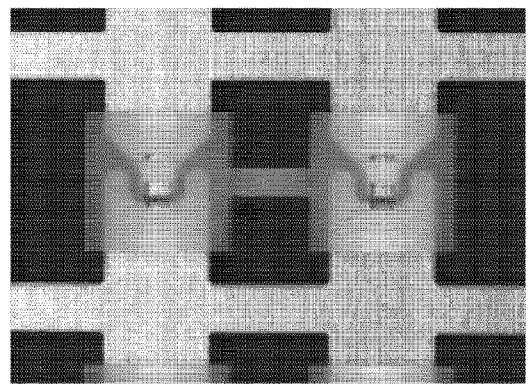
Figure 2:
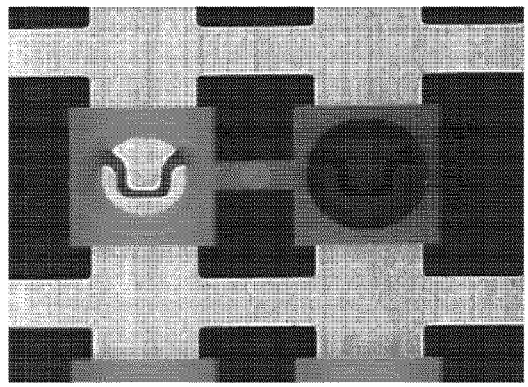
Figure 2:
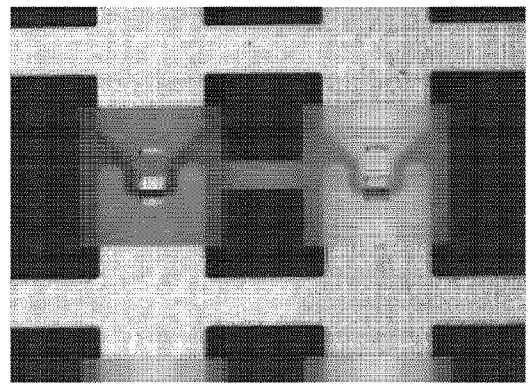

A photograph of the molded article used for the red ink test of the working examples is shown in FIG. 1, and photographs showing the case of being judged to be "leaked" in the red ink test in the working examples are shown in FIG. 2.

TABLE 1

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Thermoplastic resin (A) | PA9T-1 | 90 | 65 |  |  |  |  |  |  |  |
|  | PA9T-2 |  |  | 50 | 45 |  |  | 100 |  |  |
|  | PA46 |  |  |  |  | 90 | 65 |  | 100 | 70 |
| Inorganic fibrous reinforcement (B) | Wollastonite | 10 | 35 | 50 | 55 | 10 | 35 |  |  |  |
|  | Glass fiber |  |  |  |  |  |  |  |  | 30 |
| Red ink test |  | Not leaked | Not leaked | Not leaked | Not leaked | Not leaked | Not leaked | Leaked | Leaked | Leaked |

The respective components shown in Table 1 are as follows.

[Thermoplastic Resin (A)]

PA9T-1:

PA9T, manufactured by Kuraray Co., Ltd. (polyamide in which the dicarboxylic acid unit is a terephthalic acid unit, and the diamine unit is a 1,9-nonanediamine unit and a 2-methyl-1,8-octanediamine unit (molar ratio: 85/15), melting point: 305° C., glass transition temperature: 125° C.

PA9T-2:

PA9T, manufactured by Kuraray Co., Ltd. (polyamide in which the dicarboxylic acid unit is a terephthalic acid unit, and the diamine unit is a 1,9-nonanediamine unit and a 2-methyl-1,8-octanediamine unit (molar ratio: 80/20), melting point: 301° C., glass transition temperature: 125° C.

PA46:

"Stanyl TW341", manufactured by DSM Japan K.K., PA46 (polyamide in which the main dicarboxylic acid unit is an adipic acid unit, and the main diamine unit is a 1,4-butanediamine unit), melting point: 295° C., glass transition temperature: 75° C.

[Inorganic Fibrous Reinforcement (B)]

Wollastonite

"SH1250", manufactured by Kinsei Matec Co., Ltd., average fiber diameter: 5.3 μm, average fiber length: 85 μm, aspect ratio=16/1

Glass Fiber:

"CS3J256S", manufactured by Nitto Boseki Co., Ltd., average fiber diameter: 11 μm, average fiber length: 3 mm As shown in Table 1, it is noted from comparison between the Examples and the Comparative Examples, the waterproof component of the present invention is excellent with respect to the waterproofness after the reflow process.

INDUSTRIAL APPLICABILITY

In accordance with the present invention, it is possible to provide a waterproof component that is an insert molded body, which has sufficient waterproofness even after a heating process, such as a reflow process. The waterproof component is useful especially as an external connection terminal, etc. of an electronic device.

The invention claimed is:

1. A waterproof component that is an insert molded body formed from a thermoplastic resin composition molded onto a metal component insert such that no gap is formed between the then toplastic resin composition and metal component insert,
   wherein the thermoplastic resin composition comprises a thermoplastic resin (A) and an inorganic fibrous reinforcement (B);
   wherein the thermoplastic resin (A) is a crystalline polyamide,
   wherein a melting point of the thermoplastic resin (A) is 280° C. or higher,
   a content of the inorganic fibrous reinforcement (B) is 8 to 130 parts by mass based on 100 parts by mass of the thermoplastic resin (A); and
   the inorganic fibrous reinforcement (B) has an average fiber diameter of 9 μm or less and an average fiber length of 300 μm or less.

2. The waterproof component according to claim 1, wherein a glass transition temperature of the thermoplastic resin (A) is 130° C. or higher.

3. The waterproof component according to claim 1, wherein in the crystalline polyamide 50 to 100 mol % of a diamine unit thereof is an aliphatic diamine unit having 4 to 18 carbon atoms.

4. The waterproof component according to claim 1, wherein the inorganic fibrous reinforcement (B) is at least one selected from the group consisting of wollastonite, a potassium titanate whisker, and a milled fiber.

5. The waterproof component according to claim 4, wherein the inorganic fibrous reinforcement (B) is wollastonite.

6. The waterproof component according to claim 1, which is used for an application to be applied in a surface mounting process.

7. The waterproof component according to claim 1, which is an external connection terminal.

8. The waterproof component according to claim 1, which is a switch.

9. An electronic device comprising the waterproof component according to claim 1.

10. The electronic device according to claim 9, which is a portable electronic device.

11. A method, comprising waterproofing an insert molded body by forming a thermoplastic resin composition molded onto a metal component insert such that no gap is formed between the thermoplastic resin composition and metal component insert,
   wherein the thermoplastic resin composition comprises a thermoplastic resin (A) and an inorganic fibrous reinforcement (B);
   wherein the thermoplastic resin (A) is a crystalline polyamide,
   wherein a melting point of the thermoplastic resin (A) is 280° C. or higher,
   a content of the inorganic fibrous reinforcement (B) is 8 to 130 parts by mass based on 100 parts by mass of the thermoplastic resin (A); and
   the inorganic fibrous reinforcement (B) has an average fiber diameter of 9 μm or less and an average fiber length of 300 μm or less.

12. A method, comprising waterproofing an electronic device with the waterproof component according to claim 1, wherein the waterproof component is used as an external connection terminal.

13. A method, comprising waterproofing an electronic device with the waterproof component according to claim 1, wherein the waterproof component is used as a switch.

14. A method for producing a waterproof component, comprising
subjecting a thermoplastic resin composition and a metal component to insert molding, the thermoplastic resin composition being obtained through melt kneading of 100 parts by mass of a thermoplastic resin (A) and an inorganic fibrous reinforcement (B) having an average fiber diameter of 9 μm or less and an average fiber length of 300 μm or less in a use amount of 8 to 130 parts by mass, and wherein the thermoplastic resin (A) is a crystalline polyamide.

15. The waterproof component according to claim 1, wherein the insert molded body has external dimensions of 15 mm or less in width, 50 mm or less in depth, and 50 mm or less in thickness, wherein the depth is longer than the width.

16. The waterproof component according to claim 1, wherein heating the waterproof component in a reflow process does not result in a gap formed between the thermoplastic resin composition and metal component insert.

* * * * *